United States Patent [19]

Bucksbaum et al.

[11] Patent Number: 4,511,779
[45] Date of Patent: Apr. 16, 1985

[54] MICROWAVE OVEN SHELF

[75] Inventors: Arnold M. Bucksbaum, Cedar Rapids; James E. Simpson, Coralville, both of Iowa

[73] Assignee: Amana Refrigeration, Inc., Amana, Iowa

[21] Appl. No.: 472,448

[22] Filed: Mar. 7, 1983

[51] Int. Cl.³ .............................................. H05B 6/64
[52] U.S. Cl. ........................ 219/10.55 E; 219/10.55 F
[58] Field of Search ............... 219/10.55 E, 10.55 F, 219/10.55 R, 10.55 D

[56] References Cited
U.S. PATENT DOCUMENTS

| | | | |
|---|---|---|---|
| 2,912,554 | 11/1959 | Snyder | 219/10.55 F |
| 3,936,627 | 2/1976 | Fitzmayer | 219/10.55 F |
| 3,949,184 | 4/1976 | Freedman | 219/10.55 E |
| 4,455,467 | 6/1984 | Dills | 219/10.55 E |

FOREIGN PATENT DOCUMENTS 3040113  5/1982  Fed. Rep. of Germany . 219/10.55 E

Primary Examiner—Philip H. Leung
Attorney, Agent, or Firm—William R. Clark; Joseph D. Pannone

[57] ABSTRACT

A metal rod rack shelf for a microwave oven wherein extension support rods are substantially prevented from being excited with high electric currents. The rack is embodied with quarter wavelength choking structures in the regions where the extension support rods connect to the rack mainframe. Accordingly, the effective short circuits in those regions are transformed to open circuits at a distance of one-quarter wavelength along the support rods. As a result, the support rods do not rise to high temperatures or radiate intense microwave fields that could cause melting of or arcing to microwave transparent brackets which mount to walls of the oven cavity and engage the rods.

11 Claims, 10 Drawing Figures

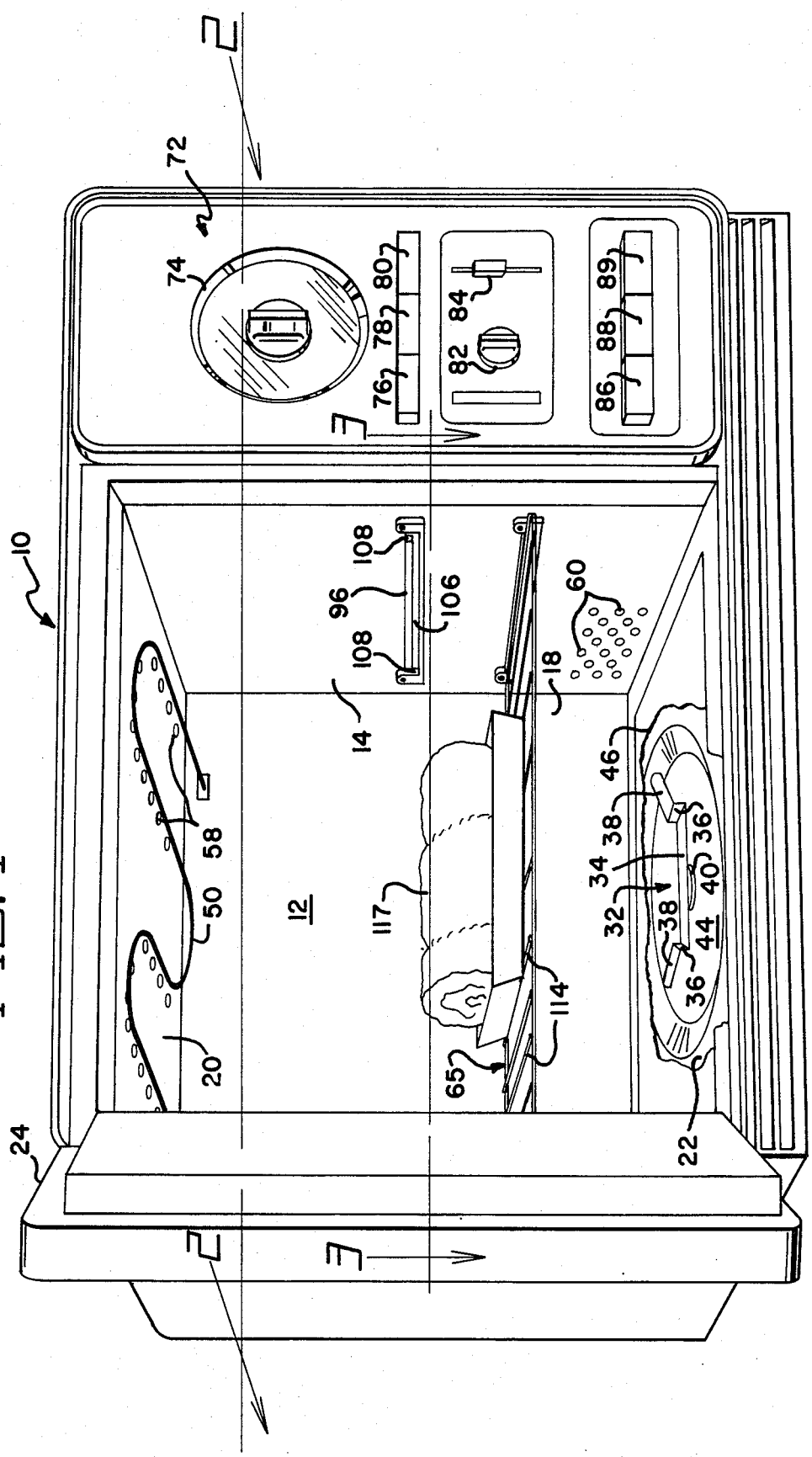

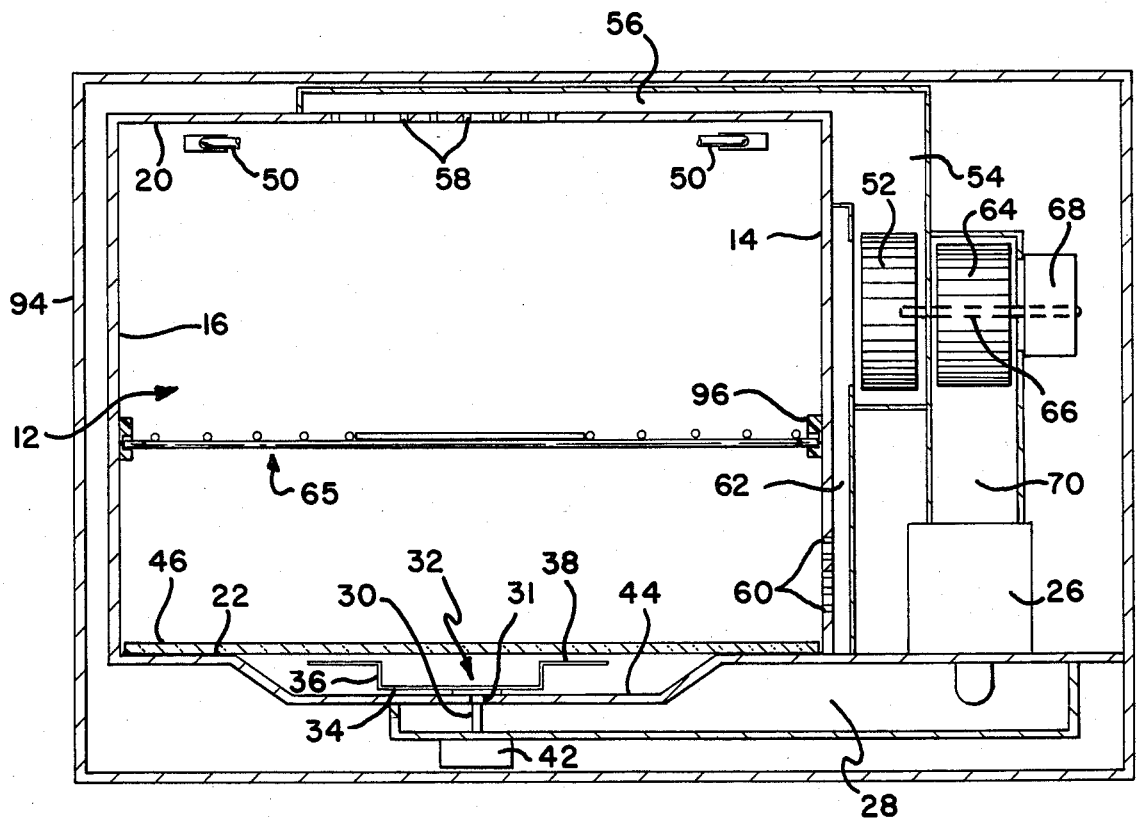

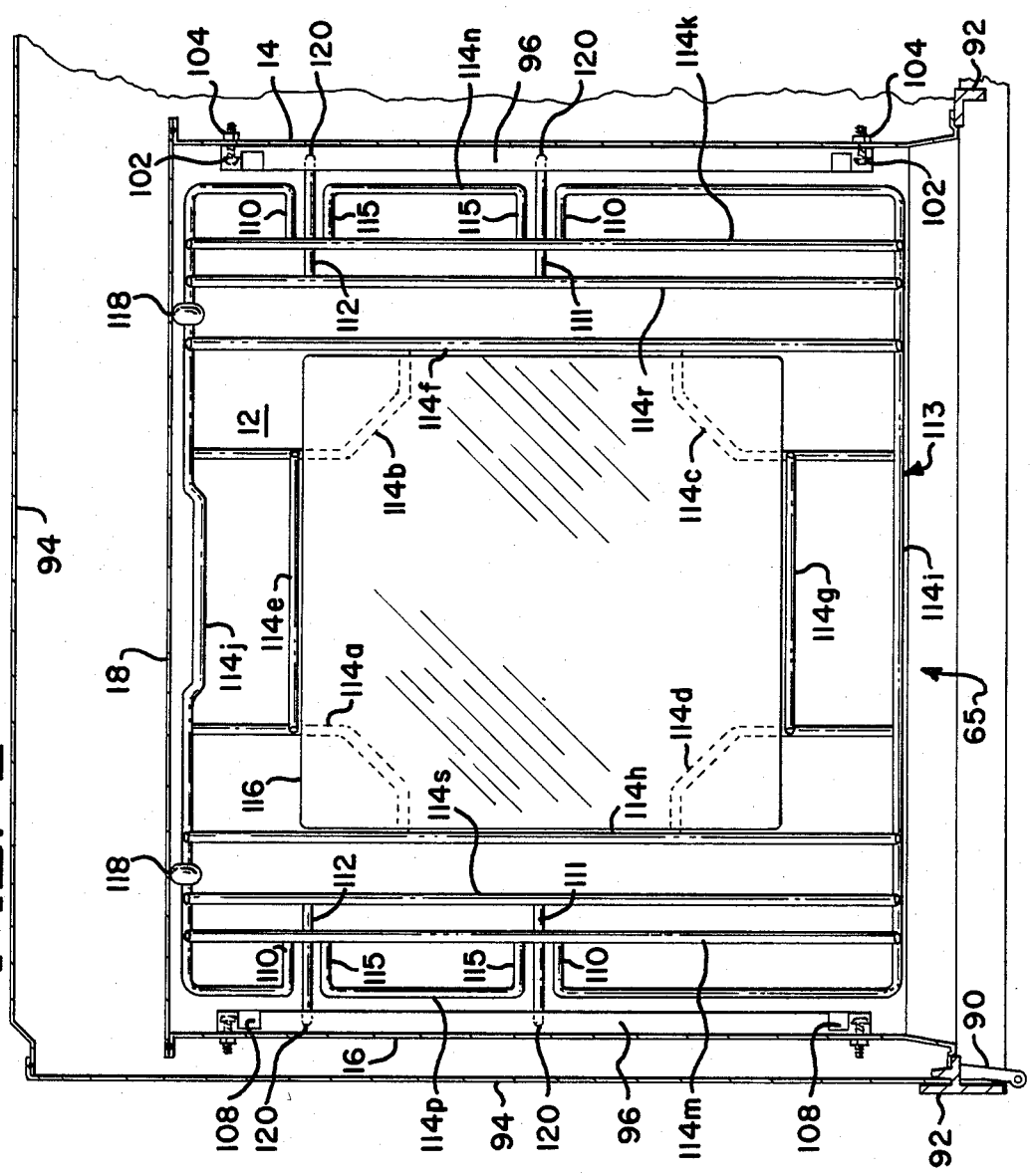

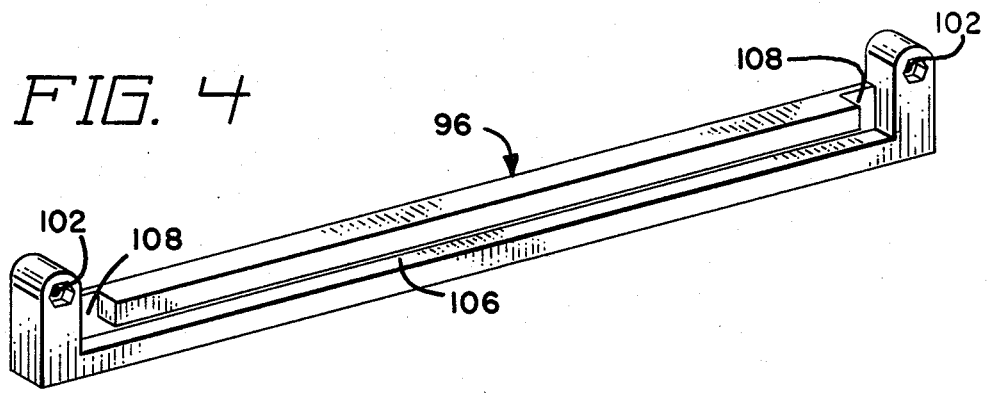
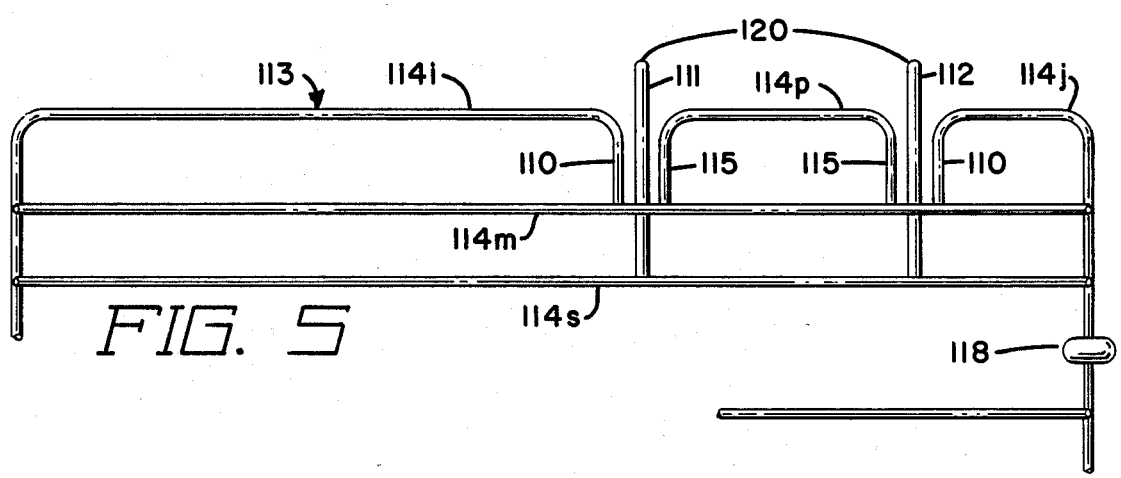
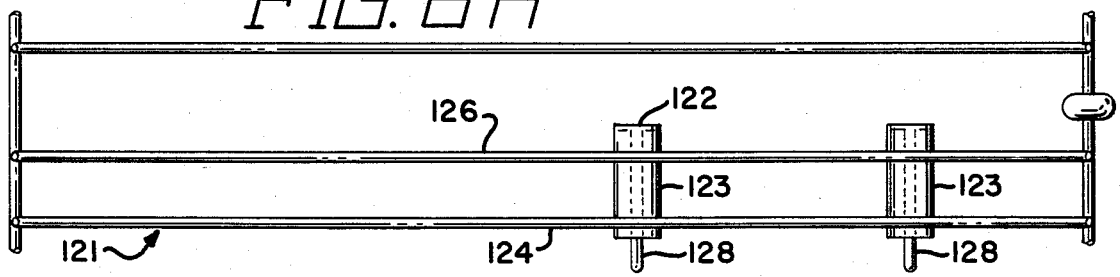
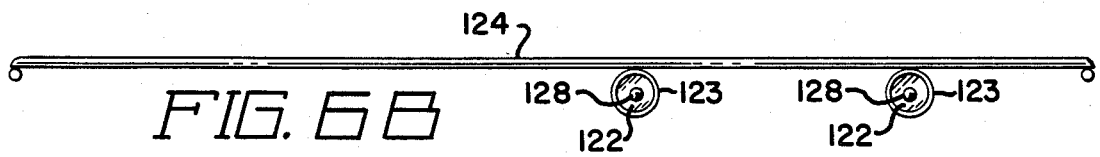

FIG. 7
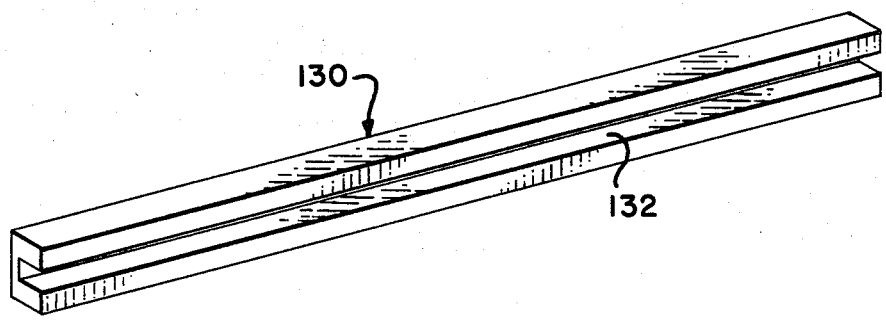
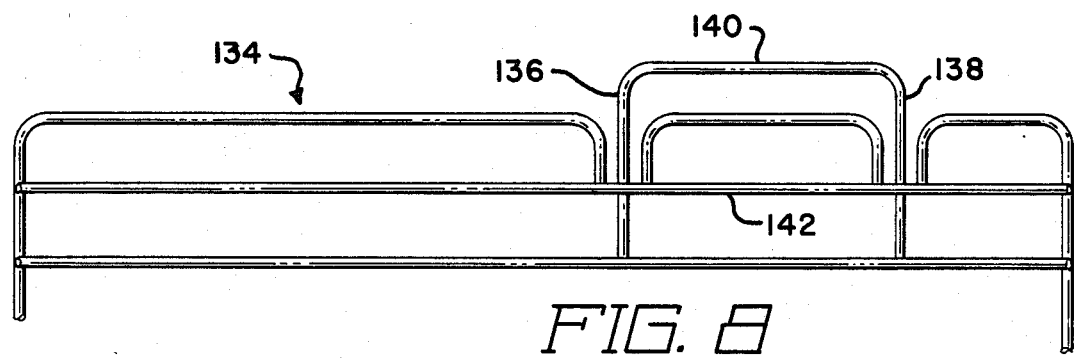
FIG. 8
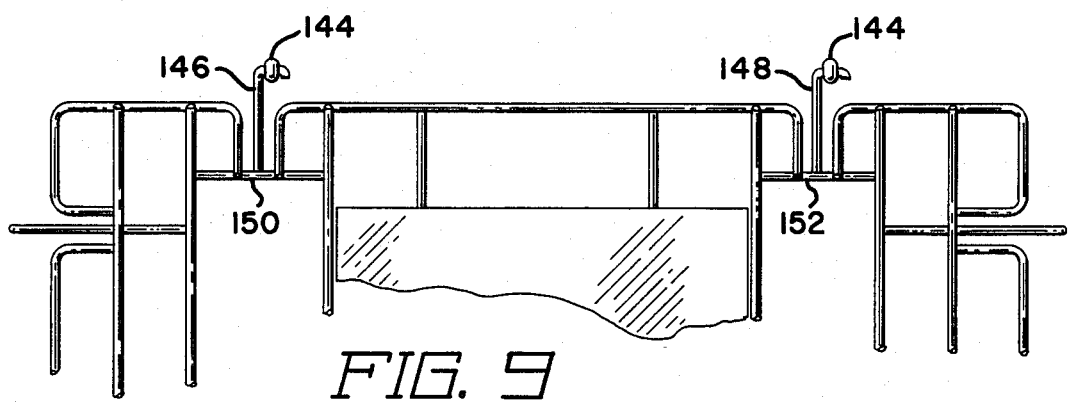
FIG. 9

MICROWAVE OVEN SHELF

BACKGROUND OF THE INVENTION

In a microwave oven, it is desirable to elevate the food a short distance from the floor of the cavity. This spaces the food from the electric component null on the conductive surface of the floor. Also, it permits microwave energy to enter the food from all sides. In the prior art, food has been elevated by a relatively thin microwave transparent tray supported at the edges of the conductive floor which is recessed downwardly in the central region.

While positioning a shelf at some level above the bottom tray may have some advantage in particular microwave cooking applications by increasing the total food supporting area, the use of an elevated shelf is of great importance in a thermal oven where the heat should be conducted into the food from all sides, including the bottom. Accordingly, in a cavity used for both microwave and thermal heating, it is most desirable to have both the bottom transparent tray and an elevated shelf thereabove.

In a prior art combination microwave and convection heat oven, a shelf defined by a metal rod rack was used. The open spaces in the rack permitted circulation of the hot air around the cavity. With this construction, it was desirable to use metal for the rods to provide sufficient strength. It was desirable to be able to change the height of the rack or remove it altogether for various cooking applications. Also, it was desirable to be able to slide the rack forward to assist in handling of the food dish. Accordingly, pairs of grooved microwave transparent shelf support brackets were screwed in vertical alignment on opposing sides of the conductive cavity. The side perimeter rods of the rack were inserted into respective horizontal grooves in the brackets thereby facilitating forward and backward movement. It was found that under unusual circumstances, the support brackets would melt or deform due to overheating. Also, there were isolated instances of arcing between the metal rack and the support bracket screws or between the metal rack and the dielectric material of the support bracket. Such arcing may occur to the surface of insulating material at microwave frequencies because the displacement current in the dielectric completes the circuit.

SUMMARY OF THE INVENTION

The invention defines a metal rod rack which is adapted for functioning as a horizontal shelf for supporting food in the cavity of a combination microwave and thermal oven, comprising first, second and third parallelly spaced rods connected perpendicularly to a fourth rod, the second rod being between the first and third rods, the first and third rods bending in opposite right angles at a distance of approximately one-quarter wavelength from their connections to the fourth rod, and the second rod extending greater than one-quarter wavelength from its connection to the fourth rod for supporting the rack in the oven. Although the microwave energy could be any frequency within the microwave spectrum, 915 megahertz or 2450 megahertz are universally used because cooking is allocated to narrow bands around them. The thermal energy may preferably be provided by a hot air convection system. It may be preferable that the first and third rods be spaced approximately 0.2 inches from parallel portions of the second rod. Also, the sections of the first and third rods on the sides of the bends opposite their connections to the fourth rod may preferably define perimeter portions of the rack. Also, the second rod may extend inwardly past its connection to the fourth rod and be connected perpendicularly to a fifth rod.

The invention may also define a shelf adapted for supporting food in an elevated position in the cavity of a microwave oven, comprising a metal rod rack having metal rods extending outwardly from opposing sides of the rack for supporting the shelf in an elevated horizontal position within the cavity, the rack compising means for suppressing the excitation of electric currents in the outwardly extending rods, and a microwave transparent plate supported by the rack. It may be preferable that the suppressing means comprise a one-quarter wavelength choke which may be defined to be a shorted transmission path which transforms a high impedance one-quarter wavelength away back the path. Preferably, the preventing means may comprise effective short circuits between the outwardly extending rods and parallelly spaced rods, the short circuits being transformed to a high impedance one-quarter wavelength away on the outwardly extending rods.

The invention may also be practiced by a microwave oven comprising a conductive cavity having parallel side walls, means for energizing the cavity with microwave energy, microwave transparent brackets connected to the side walls of the cavity, a metal rod rack for providing a shelf in the cavity, the rack having metal rods extending outwardly for supporting the rack in a horizontal position from the brackets, and the rack comprising means for substantially preventing electric currents from being excited in the outwardly extending rods by the microwave energy. The transparent brackets may preferably define horizontal grooves. The invention also defines a microwave oven comprising a conductive cavity having first and second parallel walls, means for energizing the cavity with microwave energy, first and second elongated microwave transparent brackets respectively mounted to the first and second walls of the oven, the brackets having grooves defining a horizontal plane elevated above the floor of the cavity, a metal rod rack having rods extending outwardly for supporting the bracket by engagement with the grooves, the microwave energy exciting electrical currents in the rack and the rack comprising means for suppressing the flow of the currents in the outwardly extending rods. The brackets may be fabricated of Ryton. It may be desirable to use a plurality of pairs of the first and second brackets so that the rack may be positioned at different heights.

BRIEF DESCRIPTION OF THE DRAWINGS

Objects and advantages of the invention will be more clearly understood with a reading of the Description of the Preferred Embodiment with reference to the drawings wherein:

FIG. 1 is a view of a microwave oven having hot air convection and embodying the inventive shelf to advantage;

FIG. 2 is a partial view of the microwave oven of FIG. 1 taken along line 2—2;

FIG. 3 is a partial view of the oven of FIG. 1 taken along line 3—3;

FIG. 4 is an expanded perspective view of a microwave transparent support bracket;

FIG. 5 is an expanded view of part of the rack of FIG. 1;

FIGS. 6A and 6B are top and end views of an alternate embodiment of the rack of FIG. 5;

FIG. 7 is an alternate embodiment of the support bracket of FIG. 4;

FIG. 8 is a partial view of an alternate embodiment of the rack of FIG. 5; and

FIG. 9 is a view of a choking structure which can be used for the back bumpers.

DESCRIPTION OF THE PEFERRED EMBODIMENT

Referring to FIG. 1, there is shown a microwave and hot air convection oven 10. The oven includes a common cavity 12 where food may be heated by microwave energy, convected hot air, or a combination of the two. Cavity 12 is defined by side walls 14 and 16, back wall 18, ceiling 20, floor 22 and door 24 in its closed position. These defining surfaces are all conductive. Door 24 may have a plurality of small perforations for providing a view of the interior of the cavity. Door 24 is also provided with a suitable microwave seal to prevent the escape of microwave energy from the cavity when the door is closed.

Still referring to FIG. 1 and also to FIG. 2, microwave energy, typically at a frequency of 2450 megahertz, is generated by magnetron 26 and propagated down waveguide 28 to a region under the center of floor 22. The microwave energy excites antenna probe 30 and is coupled through a small aperture 31 in floor 22 to directional antenna 32. Directional antenna 32 consists of a transmission line conductor 34, conductive vertical legs 36 and radiating elements 38. Transmission line conductor 34 is spaced from the floor 22 by apertured disks 40 which preferably are Teflon. A substantial percentage of the radiation from directional antenna 32 is from radiating elements 38 because they are spaced approximately one-quarter wavelength from floor 22 which functions as a ground plane to provide maximum radiation in a direction normal to the floor. There is very little radiation from transmission line conductor 34 because it is in close proximity to floor 22. The directive patterns of radiating elements 38 are substantially independent because elements 38 are orthogonal to each other; accordingly, the vectors are also orthogonal minimizing additive or subtractive characteristics. Motor 42 rotates probe 30 which rotates directional antenna 32. Accordingly, the patterns of the radiating elements 38 move in circles concentric to the axis of probe 30. A more detailed description of the microwave feed system is provided in U.S. Pat. No. 4,284,686 to Simpson, dated Aug. 11, 1981, which is hereby incorporated by reference.

As shown, floor 22 has a central downwardly recess 44. The top entrance to recess 44 may preferably define a circle having a diameter of 12.75 inches. The bottom of recess 44 may preferably define a circle having a diameter of 8.75 inches. The height of recess 44 may preferably be 1 inch. Directional antenna 32 is aligned in the recess as shown and radiating elements 38 are different distances from the center of rotation. A layer 46 of microwave transparent material such as Pyroceram covers the bottom of the cavity. Layer 46 which must be resistent to the temperatures to which cavity 12 is heated, provides a surface for supporting food and keeps recess 44 free from spills and deposits. Layer 46 has no appreciable affect on the microwave characteristics of cavity 12.

Heat for hot air convection is provided by electric heating element 50 which may, for example, be a Calrod. Heating element 50 is connected to an electric source in conventional manner. In operation, air is recirculated past heating element 50 by blower 52. More specifically, blower 52 forces air up duct 54 into chamber 56 which has ceiling 20 as one of its forming surfaces. The air flows from chamber 56 to cavity 12 by way of perforations 58 in ceiling 20. Perforations 58 are positioned in a pattern substantially conforming to the shape of heating element 50 so that the forced air entering cavity 12 is heated by element 50 in the convection mode. The input air for blower 52 is drawn from cavity 12 through perforations 60 and plenum 62 into duct 54. Accordingly, in the hot air convection mode, air is recirculated past heating element 50. Shelf 65, which will be described in much more detail later herein, is substantially open so that the recirculation flow of air thereby is not significantly restricted.

Blower 64 shares a common shaft 66 with blower 52. The shaft is connected to blower drive motor 68. Blower 64 intakes surrounding air and forces it down channel 70 to cool magnetron 26 as is conventionally done. The air from the magnetron is then directed outside the oven according to well-known practice.

Control panel 72 controls the operation of the cooking modes and will not be described in detail because it is the same control panel that has been used commercially in the prior art on the model RMC-20B microwave oven by Amana Refrigeration, Inc. of Amana, Iowa. Dial 74 is connected to a timer (not shown) used for timing cooking operations. Buttons 76, 78 and 80 respectively control whether the cooking is by microwave alone, a combination of microwave and hot air convection, or hot air convection alone. Control 82 can be used to set a holding temperature for the food. Slide control 84 sets the microwave power level of the oven. Bottons 86 and 88 respectively control the starting and stopping of the oven. Button 89 turns the cavity light on and off.

Referring to FIG. 3, a top view of cavity 12 taken along line 3—3 of FIG. 1 is shown. Door hinge 90 is shown but door 24 has been removed from the drawing to simplify the illustration. Decorative chrome casting 92 surrounds the access opening that door 24 closes. As described earlier herein, side walls 14 and 16 and back wall 18 partially define cavity 12. The cavity is enclosed by outer casing 94. Still referring to FIG. 3 and also to FIGS. 1 and 2, horizontal pairs of elongated shelf support brackets 96 are mounted in vertical alignment on side walls 14 and 16. Although only two pairs are shown, more pairs could be used to provide more possible positions for shelf 65. Referring to FIG. 4, an expanded view of a shelf support bracket 96 is shown. The ends of each shelf support bracket 96 are mounted to respective side walls 14 and 16 by a suitable fastener such as, for example, a bolt 102 and nut 104; screws could also be used. Each shelf support bracket 96 has an elongated horizontal groove 106 or track which acts as a guide so that shelf 65 may be slid in and out. As will be described in detail later herein, grooves 106 have openings 108 for insertion of extension rods 111 and 112 into groove 106. By fabricating openings 108 in the front and back, brackets 96 may be used for either the right or left side of cavity 12. Although other suitable materials can be used, brackets 96 are fabricated of Ryton because, not only is it transparent to microwave energy, but it is also resistent to the temperatures to which cavity 12 is elevated in the convection mode. For example, the cavity may be heated to approximately 325° F. and Ryton doesn't start to soften until approximately 500° F. Although bracket 96 could be a conductive material, a microwave transparent material has advantage because there may be arcing across air gaps that are inherently formed between loosely fitting metal parts.

Shelf 65 includes metal rack 113 which is formed by metal rods 114 such as plated steel which are connected together by suitable means such as welding. The metal provides the strength required for rack 113 which is mostly open space so as not to restrict convection air flow. An expanded view of part of rack 113 is shown in FIG. 5. Shelf 65 also includes flat plate 116 fabricated of a microwave transparent material such as glass ceramic. As is shown best in FIG. 3, plate 116 is supported in a central region of rack 113 which is void of metal rods 114. Accordingly, plate 116 can be used to support a food body 117 into which microwave energy can enter from the bottom without microwave pattern interference from the metal rods 114. Plate 116 is supported by rods 114a–d which are welded to the undersides of rods 114e–h. Accordingly, the horizontal position of plate 116 is secured.

In accordance with the invention, outer perimeter rods 114i and 114j are respectively bent inwardly at right angles and are connected to inner rods 114k and 114m. Legs 110 of rods 114i and 114j are one-quarter wavelength long. Also, U-shaped rods 114n and 114p are connected between legs 110 and have legs 115 which are parallel to legs 110 and also have a length of approximately one-quarter wavelength. Between respective legs 110 and 115, extension rods 111 and 112 extend outwardly to engage grooves 106 to support shelf 65. In addition to connecting to rods 114k and 114m, extension rods 111 and 112 also connect respectively to rods 114r and 114s to provide structural strength. Perimeter rod 114j is spaced from back wall 18 by microwave transparent bumpers 118 which prevent arcing therebetween. As can be seen best in FIG. 3, shelf 65 can be pulled outwardly by rod 114i with the ends 120 of extension rods 111 and 112 providing support while sliding in grooves 106. Central weighting on shelf 65 is predominantly supported by front extension rods 111 while back extension rods 112 maintained shelf 65 in a horizontal alignment. When front extension rods 111 reach front openings 108, the front of shelf 65 can be raised as it pivots about back extension rods 112 in grooves 106. Shelf 65 can then be pulled futher forward until rods 112 reach front openings 108 wherein, shelf 65 can be removed from the cavity.

It has been determined that the preferred embodiment fulfills the objective of preventing high currents from being induced in metal parts that contact the microwave transparent shelf support brackets 96. In the prior art, high currents heated the rod rack which caused melting or deformation of the shelf support brackets 96 under certain unusual circumstances. Also, there were rare instances of arcing between the metal rack and the dielectric material of the bracket or its fastening screws. More specifically, it was found if the rack configuration were such that the outer perimeter rods of the rack were inserted in grooves 106, standing waves set up on the rods could damage the brackets. Although, under most circumstances, the hot spots in the fields of these standing waves were not strong enough to melt or scorch the microwave transparent brackets, there were circumstances where failures did occur. The failures were generally associated with an unloaded cavity and/or the rack being in a particular undesirable position where the hot spots were maximized and adjacent to metal fasteners. More specifically, the wavelength of a standing wave is, in part, a function of the dielectric surrounding the conductor. Accordingly, by moving the rack slightly forward or backward, the characteristic of the standing wave on the rod within groove 106 would be altered as a result of the longitudinal relationship of the two parts. Occasionally, a standing wave would be created that would be strong enough to heat the rod above the melting point of the bracket. In accordance with the invention, high current is prevented in the support rods that engage grooves 106 of the Ryton shelf support brackets 96. As a result, the problem of potential melting or arcing has been solved.

In theory, the operation of the invention can be explained with reference to a shorted transmission line or a quarter wavelength choke. More specifically, currents excited in rods 114i, 114j, 114n, and 114p would see short circuits to respective extension rods 111 and 112 at the respective connections to rods 114k and 114m. These short circuits are transformed to open circuits one-quarter wavelength away back at the right angle bends. As a result, the regions around extension rods 111 and 112 are choked and, accordingly, high currents are not excited in the extension rods. In terms of an equivalent circuit, the shelf support bracket 96 can be considered as capacitance between the metal wall and an extension rod 111 and 112. The above-described quarter wavelength choke is put in series with the capacitance such that the very high impedance at the entrance to the choke is near the shelf support bracket 96. The voltage between rack 113 and oven wall 14 or 16 is finite and determined by the microwave fields in the cavity. Since the high impedance of the choke is in series with the capacitance from end 120 of the rod 111 or 112 to the wall 14 or 16, most of the voltage appears across the choke. Accordingly, the bracket is subjected to low voltage and low current. The spacings from extension rods 111 and 112 to respective legs 110 and 115 may preferably be approximately 0.2 inches. From the outer perimeter of rack 113, as defined by rods 114i and 114j, extension rods 111 and 112 preferably extend less than one-quater wavelength.

Rack 113 has been described in combination with microwave transparent support brackets. By suppressing the currents in extension rods 111 and 112 in accordance with the invention, if rack 113 were supported instead by metal brackets, there would be less, if any, arcing than if a prior art metal rod rack were used.

Referring to FIGS. 6A and 6B, partial top and side views are shown of metal rack 121 which is an alternate embodiment of metal rack 113 shown and described with reference to FIGS. 1, 2, 3 and 5. In general, the embodiment of FIGS. 6A and 6B uses a shorted coaxial line to suppress currents. More specifically, a metallic cylinder 123 is connected to the outer two rods 124 and 126 of rack 121. Connected to an end 122 of cylinder 123 is a coaxial rod 128 which extends outwardly past the rod 124 for engagement in groove 106 of a support bracket such as that shown and described with reference to FIG. 4. The operation of cylinder 123 and rod 128 in suppressing currents in rod 128 can be explained in terms of a shorted coaxial line which transforms an open circuit one-quarter wavelength away on rod 128. Accordingly, there are only very small currents induced in rod 128 and, as a result, the problems of melting the support bracket or arcing to fasteners or to the support bracket are solved.

Referring to FIG. 7, there is shown shelf support bracket 130 which is an alternate embodiment to shelf support bracket 96. Bracket 130 would be connected to side walls 14 and 16 of cavity 12 by suitable means such as, for example, screws (not shown) directed horizontally through the bottoms of grooves 132 into the side walls. The embodiments of racks 113 and 121 can be used in conjunction with shelf support bracket 130 as shown in FIG. 7. The advantage of the embodiment of bracket 96 as shown in FIG. 4 over bracket 126 as shown in FIG. 7 is that the operator is prevented from inadvertently pulling the rack forward to a position where the front end is not supported. Also, the fasteners such as bolts 102 of bracket 96 are completely isolated from surfaces of the rack.

Referring to FIG. 8, there is shown a partial view of metal rack 134 which is an alternate embodiment of metal rack 113. Rack 134 will not work in conjunction with shelf support bracket 96 as shown in FIG. 4. Accordingly, a different support such as bracket 130 as shown in FIG. 7 is required. The operation of rack 134 is protecting the microwave transparent support brackets from intense fields is similar to racks 113 and 121 previously described. More specifically, rods 136 and 138 extend outwardly and are joined by cross rod 140. High currents in the structure formed by rods 136, 138 and 140 are prevented by the high impedance reflected from the short circuit at connections to rod 142.

Referring to FIG. 9, there is shown a choke design for microwave transparent bumpers 144 which serve the same function as bumpers 118 described earlier herein. More specifically, high currents in rods 146 and 148 are prevented by respective short circuits at rods 150 and 152 which are respectively reflected as open circuits.

This completes the description of the preferred embodiment. However, those of ordinary skill in the art will recognize there are many alterations or modifications which are possible without departing from the spirit and scope of the invention. Accordingly, it is intended that the scope of the invention be limited by the appended claims rather than by the specific embodiments.

What is claimed is:

1. A microwave oven comprising:
   a conductive cavity having parallel side walls;
   means for energizing said cavity with microwave energy;
   microwave transparent brackets connected to said side walls of said cavity;
   a metal rod rack for providing a shelf in said cavity, said rack having metal rods extending outwardly in a lateral direction for supporting said rack in a horizontal position from said brackets; and
   said rack comprising a quarter wavelength choke for substantially preventing electric currents from being excited in said outwardly extending support rods by said microwave energy.

2. The oven recited in claim 1 further comprising a microwave transparent plate for supporting food, said plate being seated on said metal rod rack.

3. The oven recited in claim 1 further comprising means for recirculating heated convection air through said cavity.

4. The oven recited in claim 1 wherein said microwave transparent brackets define horizontal grooves.

5. A microwave oven, comprising:
   a conductive cavity having parallel side walls and a floor;
   means for energizing said cavity with microwave energy;
   elongated microwave transparent brackets respectively mounted horizontally on said side walls, said brackets defining horizontal grooves that are vertically aligned on said side walls;
   a rack comprising a substantially rectangular framework of metal rods connected together, said rack having at least one metal support rod extending outwardly from each of opposite sides of said framework in a lateral direction for slidably engaging said grooves of said brackets on said sidewalls to support said rack in a horizontal elevated position above said floor of said cavity; and
   said rack further comprising means for suppressing electric currents from being excited in said outwardly extending metal support rods by said microwave energy, said suppressing means comprising metal rods connected to said framework adjacent to said support rods forming a substantially short circuit therebetween, said suppressing rods respectively extending parallel to said support rods for a distance of approximately one-quarter wavelength of said microwave energy to a 90° bend away from said respective support rods.

6. The oven recited in claim 5 further comprising means for providing convected hot air in said cavity.

7. A microwave oven, comprising:
   a conductive cavity having first and second parallel walls;
   means for energizing said cavity with microwave energy;
   first and second elongated microwave transparent brackets respectively mounted to said first and second walls of said oven, said brackets having grooves defining a horizontal plane elevated above the floor of said cavity;
   a metal rod rack having support rods extending outwardly in a lateral direction for supporting said rack by engagement with said grooves, said microwave energy exciting electrical currents in said rack; and
   said rack comprising a quarter wavelength choke for suppressing the flow of said currents in said outwardly extending support rods.

8. The oven recited in claim 7 further comprising means for recirculating convection hot air through said cavity.

9. The oven recited in claim 7 further comprising a plurality of pairs of said first and second elongated microwave transparent brackets respectively mounted to said first and second walls.

10. A microwave oven, comprising:
    a conductive cavity having parallel side walls;
    means for energizing said cavity with microwave energy;
    horizontal tracks defined by microwave transparent brackets connected to said parallel side walls;
    a substantially rectangular metal rod rack for defining a horizontal shelf within said cavity, said rack having at least pairs of metal support rods extending outwardly in a lateral direction from opposing sides for seating on said tracks;

said microwave energy exciting electrical currents in said rack; and said rack further comprising metal rods spaced parallelly in front of and behind each support rod from a substantially short circuit with each respective support rod to a bend 90° away from said respective support rods one-quarter wavelength away to suppress the flow of said currents in said outwardly extending metal support rods.

11. The oven recited in claim 10 further comprising means for recirculating convection hot air through said cavity.

* * * * *